US012604216B2

(12) United States Patent　　　　　(10) Patent No.:　US 12,604,216 B2
Sathyanarayanamurthy et al.　　　　　(45) Date of Patent:　Apr. 14, 2026

(54) ALLOCATING RESOURCE ENTITIES FOR TRACE

(71) Applicant: Nokia Solutions and Networks Oy, Espoo (FI)

(72) Inventors: Kiran Sathyanarayanamurthy, Tumakuru (IN); Anatoly Andrianov, Schaumburg, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 350 days.

(21) Appl. No.: 18/300,114

(22) Filed: Apr. 13, 2023

(65) Prior Publication Data

US 2023/0345272 A1　　Oct. 26, 2023

(30) Foreign Application Priority Data

Apr. 25, 2022　(FI) ..................................... 20225345

(51) Int. Cl.
　*H04W 24/04*　　　(2009.01)
　*H04W 4/20*　　　(2018.01)
　*H04W 28/08*　　　(2023.01)
　*H04W 72/52*　　　(2023.01)

(52) U.S. Cl.
　CPC ............. *H04W 24/04* (2013.01); *H04W 4/20* (2013.01); *H04W 28/08* (2013.01); *H04W 72/52* (2023.01)

(58) Field of Classification Search
　CPC ....... H04W 24/04; H04W 4/20; H04W 28/08; H04W 72/52; H04W 24/02; H04W 24/08; H04L 43/02; H04L 41/14
　See application file for complete search history.

(56) References Cited

U.S. PATENT DOCUMENTS

| | | | |
|---|---|---|---|
| 9,119,080 B2 | 8/2015 | Jactat et al. | |
| 10,567,245 B1 | 2/2020 | Patil et al. | |
| 2005/0276386 A1 | 12/2005 | Ethier et al. | |
| 2012/0059869 A1* | 3/2012 | Seo ...................... | G06F 16/972 |
| | | | 709/202 |
| 2012/0089876 A1 | 4/2012 | Racz et al. | |

(Continued)

FOREIGN PATENT DOCUMENTS

CN　　　103747468 A　　4/2014

OTHER PUBLICATIONS

"3rd Generation Partnership Project; Technical Specification Group Services and System Aspects; Telecommunication management; Subscriber and equipment trace; Trace concepts and requirements (Release 17)", 3GPP TS 32.421, V17.2.0, Jun. 2021, pp. 1-49.

(Continued)

*Primary Examiner* — Kibrom T Hailu

(74) *Attorney, Agent, or Firm* — Tong, Rea, Bentley & Kim, LLC

(57)　　　　　ABSTRACT

There is provided receiving, at a network entity, a message from at least one peer network entity, determining, if the received message comprises information indicating a trace, at least one trace capable resource entity for processing the received message or subsequent messages of a session of the received message from a set of resource entities comprising trace capable resource entities and trace disabled resource entities, allocating the received message or the subsequent messages of a session of the received message to the determined at least one trace capable resource entity.

13 Claims, 6 Drawing Sheets

(56) References Cited

U.S. PATENT DOCUMENTS

| | | | | |
|---|---|---|---|---|
| 2013/0114446 A1* | 5/2013 | Liu | .............. | H04W 24/10 |
| | | | | 370/252 |
| 2013/0275606 A1* | 10/2013 | Lyer | .............. | H04L 61/45 |
| | | | | 709/230 |
| 2017/0346675 A1 | 11/2017 | Prokofiev | | |
| 2021/0144082 A1 | 5/2021 | Bisht et al. | | |
| 2023/0370344 A1* | 11/2023 | Lee | .............. | H04L 65/40 |

OTHER PUBLICATIONS

"3rd Generation Partnership Project; Technical Specification Group Services and System Aspects; Telecommunication management; Subscriber and equipment trace; Trace data definition and management (Release 17)", 3GPP TS 32.423, V17.3.0, Dec. 2021, pp. 1-109.

Fajardo et al., "Diameter Base Protocol", RFC 6733, Internet Engineering Task Force (IETF), Oct. 2012, pp. 1-152.

"New SID on further Enhancements of Management of Trace/MDT", 3GPP TSG-SA5 Meeting #141-e, S5-221514, Agenda: 6.2, Nokia, Jan. 17 -26, 2022, 3 pages.

"3rd Generation Partnership Project; Technical Specification Group Services and System Aspects; Procedures for the 5G System (5GS); Stage 2 (Release 17)", 3GPP TS 23.502, V17.3.0, Dec. 2021, pp. 1-727.

"3rd Generation Partnership Project; Technical Specification Group Core Network and Terminals; 5G System; Network Function Repository Services; Stage 3 (Release 17)", 3GPP TS 29.510, V17.3.0, Sep. 2021, pp. 1-271.

Office action received for corresponding Finnish U.S. Appl. No. 20/225,345, dated Oct. 27, 2022, 10 pages.

"Rel-17 draftCR 32.422 Add metric identifier for trace metrics", 3GPP TSG-SA5 Meeting #142-e, S5-222635, Nokia, Apr. 4-12, 2022, 6 pages.

"3rd Generation Partnership Project; Technical Specification Group Services and System Aspects; Telecommunication management; Subscriber and equipment trace; Trace control and configuration management (Release 17)", 3GPP TS 32.422, V17.6.1, Mar. 2022, pp. 1-232.

Action received for corresponding Finnish Patent Application No. 20225345, dated Mar. 30, 2023, 11 pages.

Extended European Search Report received for corresponding European Patent Application No. 23168847.4, dated Sep. 15, 2023, 8 pages.

* cited by examiner 202 receiving, at a network entity, a message from at least one peer network entity 204 determining, at the network entity, if the received message comprises information indicating a trace, at least one trace capable resource entity for processing the received message or subsequent messages of a session of the received message from a set of resource entities comprising trace capable resource entities and trace disabled resource entities 206 allocating, at the network entity, the received message or the subsequent messages of a session of the received message to the determined at least one trace capable resource entity

Fig. 2

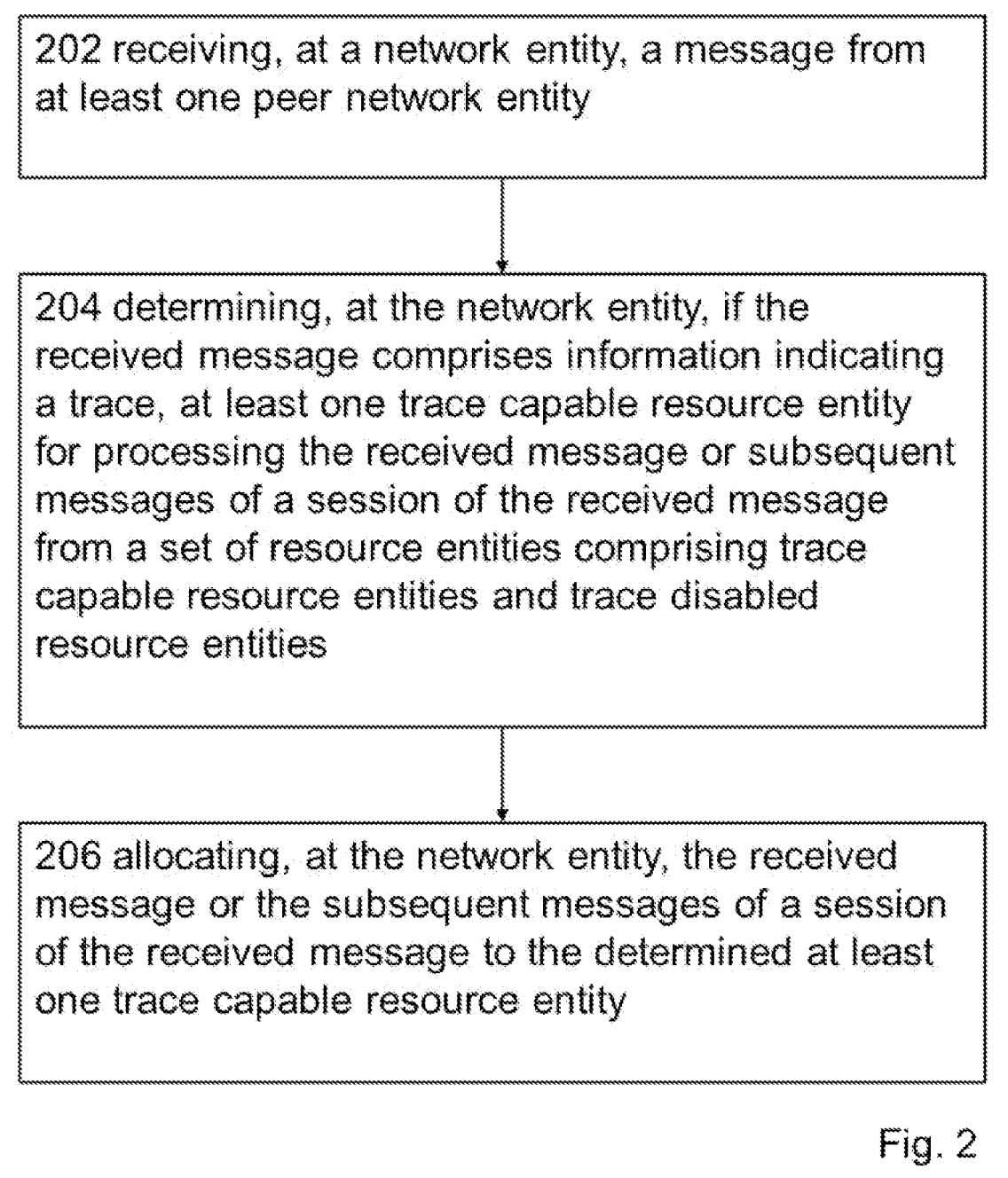

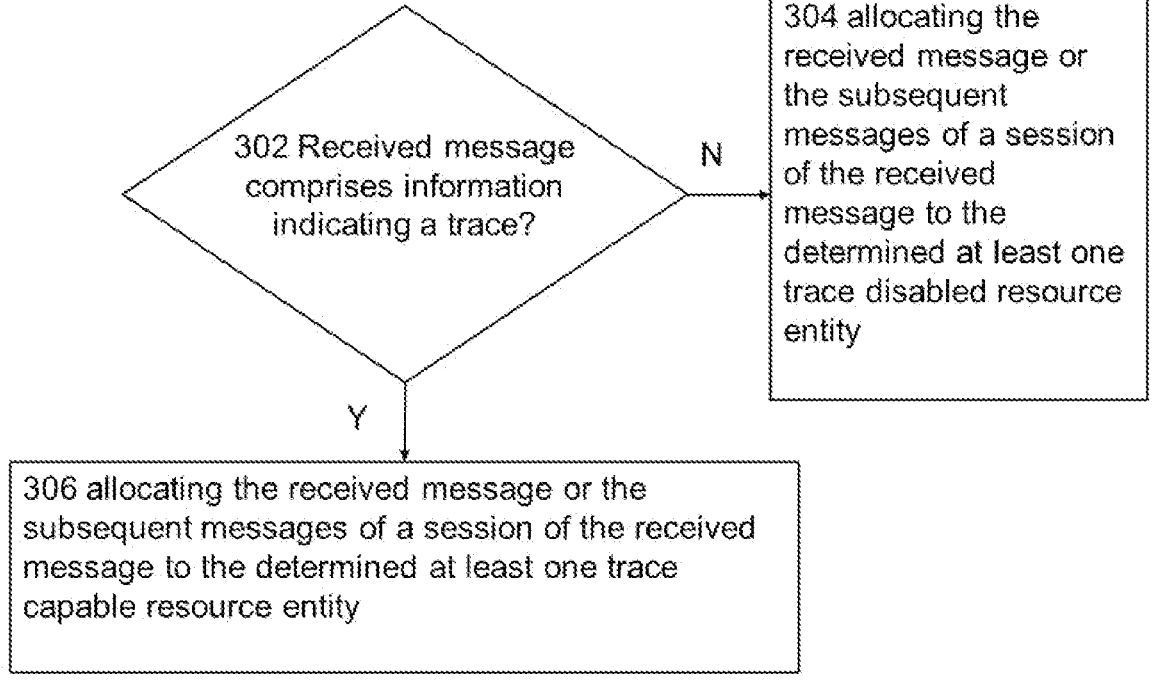

304 allocating the received message or the subsequent messages of a session of the received message to the determined at least one trace disabled resource entity 302 Received message comprises information indicating a trace?

N

Y 306 allocating the received message or the subsequent messages of a session of the received message to the determined at least one trace capable resource entity

Fig. 3

ALLOCATING RESOURCE ENTITIES FOR TRACE

TECHNICAL FIELD

The present invention relates to supporting trace at a network entity.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Subscriber and User Equipment (UE) trace provide very detailed information at call level on one or more specific mobile(s). This data is an additional source of information to Performance Measurements and allows going further in monitoring and optimization operations.

Contrary to Performance Measurements, which are a permanent source of information, trace is activated on user demand for a limited period of time for specific analysis purposes.

Trace plays a major role in activities such as determination of the root cause of a malfunctioning mobile, advanced troubleshooting, optimization of resource usage and quality, Radio Frequency (RF) coverage control and capacity improvement, dropped call analysis, Core Network and Access Network end-to-end procedure validation.

The capability to log data on any interface at call level for a specific user, e.g. international mobile subscriber identity (IMSI), or mobile type, e.g. International Mobile Equipment Identity (IMEI) or IMEI software version (IMEISV), or service initiated by a user allows getting information which cannot be deduced from Performance measurements such as perception of end-user Quality of service (QoS) during his call, e.g. requested QoS vs. provided QoS, correlation between protocol messages and RF measurements, or interoperability with specific mobile vendors.

Moreover, Performance Measurements provide values aggregated on an observation period; Subscriber and UE Trace give instantaneous values for a specific event, e.g. call, location update, etc.

If Performance Measurements are mandatory for daily operations, future network planning and primary trouble shooting; Subscriber and UE Trace is the easy way to go deeper into investigation and network optimization.

In order to produce this data, Subscriber and UE Trace are carried out in the NEs, which comprise the network. The data can then be transferred to an external system (e.g. an Operations System (OS) in Telecommunications Management Network (TMN) terminology, for further evaluation).

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect there is provided a method comprising:

receiving, at a network entity, a message from at least one peer network entity;

determining, at the network entity, if the received message comprises information indicating a trace, at least one trace capable resource entity for processing the received message or subsequent messages of a session of the received message from a set of resource entities comprising trace capable resource entities and trace disabled resource entities;

allocating, at the network entity, the received message or the subsequent messages of a session of the received message to the determined at least one trace capable resource entity.

According to a second aspect there is provided a network entity comprising one or more processors, and memory storing instructions that, when executed by the one or more processors, the network entity is caused to:

receive, at the network entity, a message from at least one peer network entity;

determine, at the network entity, if the received message comprises information indicating a trace, at least one trace capable resource entity for processing the received message or subsequent messages of a session of the received message from a set of resource entities comprising trace capable resource entities and trace disabled resource entities;

allocate, at the network entity, the received message or the subsequent messages of a session of the received message to the determined at least one trace capable resource entity.

According to a third aspect there is provided a network entity comprising: means for means for receiving at the network entity, a message from at least one peer network entity;

means for determining, at the network entity, if the received message comprises information indicating a trace, at least one trace capable resource entity for processing the received message or subsequent messages of a session of the received message from a set of resource entities comprising trace capable resource entities and trace disabled resource entities;

means for allocating, at the network entity, the received message or the subsequent messages of a session of the received message to the determined at least one trace capable resource entity.

According to a fourth aspect there is provided a computer program comprising computer readable program code means adapted to perform at least the following:

receive, at a network entity, a message from at least one peer network entity;

determine, at the network entity, if the received message comprises information indicating a trace, at least one trace capable resource entity for processing the received message or subsequent messages of a session of the received message from a set of resource entities comprising trace capable resource entities and trace disabled resource entities;

allocate, at the network entity, the received message or the subsequent messages of a session of the received message to the determined at least one trace capable resource entity.

According to a fifth aspect there is provided a non-transitory computer readable medium comprising program instructions for causing a network entity to perform at least the following:

receive, at the network entity, a message from at least one peer network entity;

determine, at the network entity, if the received message comprises information indicating a trace, at least one trace capable resource entity for processing the received message or subsequent messages of a session of the received message from a set of resource entities comprising trace capable resource entities and trace disabled resource entities;

allocate, at the network entity, the received message or the subsequent messages of a session of the received message to the determined at least one trace capable resource entity.

One or more of the above aspects may comprise at least some of the following features of the following list:

determining, at the network entity, if the received message does not comprise information indicating a trace, at least one trace disabled resource entity for processing the received message or subsequent messages of a session of the received message from a set of resource entities comprising trace capable resource entities and trace disabled resource entities; allocating, at the network entity, the received message or the subsequent messages of a session of the received message to the determined at least one trace disabled resource entity.

determining, at the network entity, at least one tracing load; scaling, at the network entity, if the tracing load level exceeds a load threshold, the set of resource entities based on the tracing load.

the trace capable resource entities are dedicated for traces and the trace disabled resource entities are dedicated for session processing;

receiving, at the network entity, from an operations, administration and management, OAM, system one or more identity values and/or uniform resource indicators to one or more identity values; and determining, at the network entity, if the received message comprises information indicating a trace, based on the received one or more identity values and/or uniform resource indicators to one or more identity values;

the information indicating a trace is a trace indication information element, IE, of: a Diameter Base Protocol, a header of a HTTP message, a payload of a HTTP message or an ASN.1 message.

At least some embodiments provide improved support for traces at a network entity of a communications system.

BRIEF DESCRIPTION OF THE DRAWINGS

For a more complete understanding of example embodiments of the present invention, reference is now made to the following descriptions taken in connection with the accompanying drawings in which:

FIG. 2, FIG. 3 and FIG. 5 illustrate examples of methods in accordance with at least some embodiments;

DETAILED DESCRIPTION OF SOME EXAMPLE EMBODIMENTS

Figure 1:
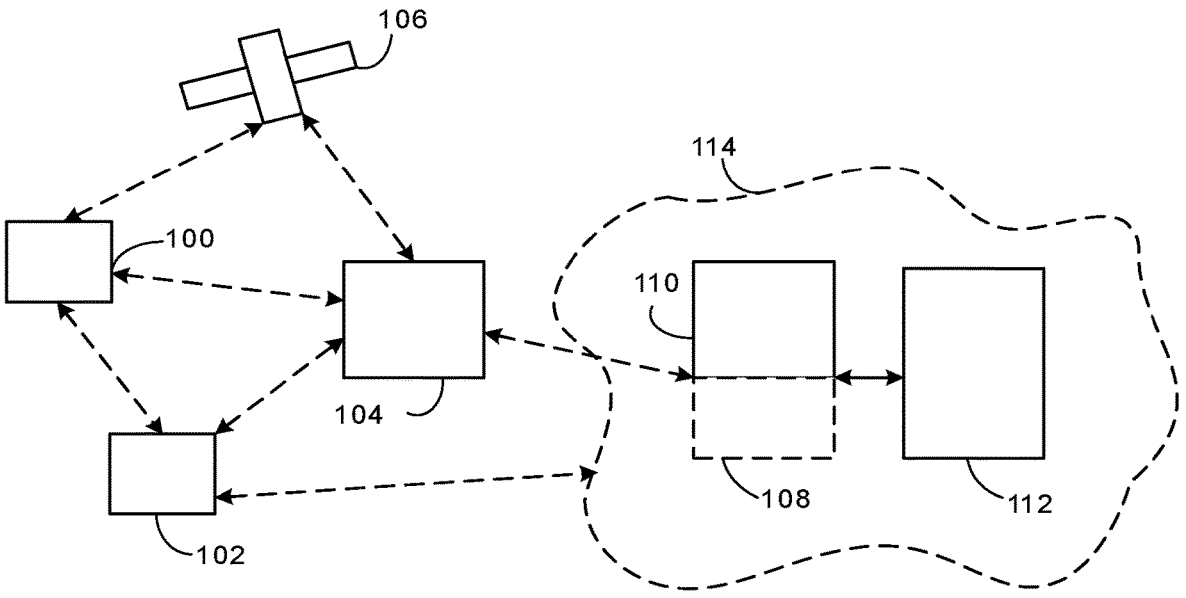
FIG. 1 shows an example of communications system in accordance with at least some embodiments described herein.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Use of ordinal terms such as "first," "second," "third," etc., in the claims and description to modify a described feature does not by itself connote any priority, precedence, or order of one described feature over another or the temporal order in which acts of a method are performed, but are used merely as labels to distinguish one described feature having a certain name from another described feature having a same name (but for use of the ordinal term) to distinguish the described feature.

Trace, or trace functionality, may be a Subscriber and User Equipment (UE) trace standardized by 3GPP in Technical Specifications 32.421, 32.422 and 32.423. The trace functionality supported by existing network entities and in communication networks may be seen as a secondary functionality, since not being critical for support of session processing, e.g. processing of calls and data sessions. Additionally, the trace functionality may be particularly resource consuming for the existing network entities, since tracing implies additional processing requirement on top of session processing, such as message logging, reporting of signaling messages to a trace collection entity and maintenance of additional information about traced subscribers, to name a few. In an example, an incorrectly implemented trace and/or excessive tracing enabled by mistake in a heavily loaded system may play the role in local and even network-wide outages. In essence, there is a trade-off between efficient implementation of primary functionalities such as call and data session processing at network entities and trace functionalities that may be needed to collect detailed information necessary for system troubleshooting, per-subscriber network optimization, and lately as input to various Artificial Intelligence/Machine Learning functions and control loops. Therefore, without proper support for the trace functionality, the trace functionality may impact negatively performance of a network entity. Proper support for the tracing facilitates tracing to become continuous and real-time, and capturing signaling traces of a complete application interface or of a wide range of subscribers.

There is provided improved support for traces in a communications system. A network entity of the communication system receives a message from at least one peer network entity, and determines, if the received message comprises information indicating a trace, at least one trace capable resource entity for processing the received message or subsequent messages of a session of the received message from a set of resource entities comprising trace capable resource entities and trace disabled resource entities. The received message or the subsequent messages of a session of the received message is allocated to the determined at least one trace capable resource entity. In this way the processing of traced sessions from non-traced sessions may be separated. Accordingly, traced sessions, e.g. calls or data sessions, may be processed at trace capable resource entities, or T-Workers, and non-traced sessions at trace disabled resource entities, or N-Workers, which facilitates load distribution and allocation of traced sessions among the T-Workers and load distribution of non-traced sessions among the N-Workers. In this way the processing requirements of traces, or trace functionalities, may be attended to by the T-Workers that may be optimized for traces. The N-Workers that may be optimized for the primary functions of the communications system. Examples of the T-Workers and N-Workers comprise at least network functions (NFs)

and parts of NFs, e.g. network function components. In an example of supporting the traces at the network entity, the T-Workers may be a sub-set of Worker functions, or resource entities, for trace processing, and the T-Workers may be equipped with extra capabilities, compared to the N-Workers, that belong to another subset of the Worker functions. The extra capabilities may comprise for example one or more of: extra memory for traced data storage, persistent connection to a trace control entity (TCE) for trace data reporting, hardware acceleration. A load balancer, or a trace aware routing dispatcher, at the network entity, may be made aware of the T-Workers and their extra capabilities, whereby the load balancer may perform allocations to individual Workers. The load balancer may maintain information of availability of the Workers based on load information from the Workers. Availability of the Workers with extra capabilities, i.e. availability of the T-Workers, may be matched to incoming messages, e.g. requests, relying upon (or benefiting from) these extra capabilities. In other words, incoming requests that are identified comprise information indicating a trace, e.g. to comprise a trace activation information element, may be allocated to the T-Workers, while other messages, e.g. regular requests, may be allocated to the N-Workers.

FIG. 1 shows an example of communications system in accordance with at least some embodiments described herein.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device, also called a user equipment (UE), a user terminal, a terminal device, a wireless device, a mobile station (MS) etc., illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. tens or hundreds of antenna elements, implemented in a single antenna panel or in a plurality of antenna panels, capable of using a plurality of simultaneous radio beams for communication with the UE. The UEs may be provided with MIMO antennas having an antenna array consisting of plurality of antenna elements a.k.a. patches, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHZ-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (e.g. in a distributed unit, DU) and non-real time functions being carried out in a centralized manner (e.g. in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 106, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or High Altitude Platforms Stations (HAPSs). Satellite communication may utilize geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node 104 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells, or so-called small cells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

FIG. 2 illustrates an example of a method in accordance with at least some embodiments. The method provides improved support for traces at a network entity of a communications system. The method may be performed by the network entity, when the network entity is configured to identify whether a received message comprises information indicating a trace and set of resource entities comprising trace capable resource entities, or T-Workers, and trace disabled resource entities, or N-Workers, is available to the network entity for processing messages received by the network entity.

Phase 202 comprises receiving, at a network entity, a message from at least one peer network entity.

Phase 204 comprises determining, at the network entity, if the received message comprises information indicating a trace, at least one trace capable resource entity for processing the received message or subsequent messages of a session of the received message from a set of resource entities comprising trace capable resource entities and trace disabled resource entities. In this way traced sessions may be processed separately from non-traced sessions, which allows allocation and load distribution may be performed separately for the traced sessions and non-traced sessions.

Phase 206 comprises allocating, at the network entity, the received message or the subsequent messages of a session of the received message to the determined at least one trace capable resource entity.

In an example, phase 202 comprises that that the received message is a signaling message, e.g. a control plane message. Examples of the peer network entities may be a core network entity, a radio access network entity. Examples of the network entities comprise at least Call Session Control Function (CSCF), Diameter Routing Agent (DRA), Autonomous System (AS), central unit control plane (CU-CP), central unit user plane (CU-CP) and distributed unit (DU).

In an example in accordance with at least some embodiments, phase 206 comprises that the trace capable resource entities are dedicated for traces and the trace disabled resource entities are dedicated for session processing. In an example, trace capable resource entities are performance-optimized for the sessions that are traced. In an example, a resource entity that is performance-optimized for the sessions that are traced may be configured to comprise a larger storage capacity than a resource entity that is not performance-optimized for the sessions that are traced, e.g. a resource entity that is performance-optimized for sessions that are not traced. In an example, a resource entity, may be an entity configured to process messages associated with a session of a communications network. The network entity may be a network function (NF) or a part of a network function, e.g. a network function component. In an example, a resource entity may comprise a configuration attribute for indicating whether the resource entity is a trace capable resource entity or a trace disabled resource entity. The configuration attribute may be set e.g. via operations, administration and management, OAM, system.

In an example, the method of FIG. 2 may be performed at a 5G-core NF comprising multiple NF components configured to implement Unified Data Management (UDM). The 5G-code NF may be configured to support trace and execute the phases 202, 204 and 206 of FIG. 2, whereby the received message may be allocated to a trace capable resource entity, or T-Worker. The 5G-core may additionally comprise a load balancer that is configured to determine one or more tracing loads of trace capable resource entities and to scale, if a determined tracing load level exceeds a load threshold, the trace capable resource entities, or T-Workers. The scaling may comprise e.g. instantiating on or more additional trace capable resource entities, or T-Workers.

In an example, the method of FIG. 2 may be performed at an NR NF implemented according to a distributed architecture. Accordingly, the NR NF may comprise a central unit (CU) and one or more distributed units (DUs), and the CU may comprise a central unit control plane node (CU-CP) and a central unit user plane node (CU-UP). The NR NF may comprise both trace capable instances, T-Workers, and trace disabled instances, N-Workers, of the DU(s), CU-CP and CU-UP, and DU(s). The NR NF may be configured to support trace and execute the phases 202, 204 and 206 of FIG. 2, whereby the received message or subsequent messages of the session at the NR NF may be allocated to at least one of the trace capable instances or to at least one of the trace disabled instances. The NR NF may additionally comprise a load balancer that is configured to determine one or more tracing loads of the T-Workers and to scale, if a determined tracing load level exceeds a load threshold, the T-Workers. The scaling may comprise e.g. instantiating on or more additional T-Workers, i.e. DU(s), CU-CP and CU-UP, and DU(s).

In an example in accordance with at least some embodiments, phase 204 further comprises determining, at the network entity, if the received message does not comprise information indicating a trace, at least one trace disabled resource entity for processing the received message or subsequent messages of a session of the received message from a set of resource entities comprising trace capable resource entities and trace disabled resource entities. Then phase 206 comprises allocating, at the network entity, the received message or the subsequent messages of a session of the received message to the determined at least one trace disabled resource entity.

In an example in accordance with at least some embodiments, phase 206 comprises determining, at the network entity, at least one tracing load and scaling, if the tracing load level exceeds a load threshold, the set of resource entities based on the tracing load. In an example, the tracing load may be determined based on load information from one or more trace capable resource entities, expected traced traffic received at the network entity and/or one or more capabilities of the trace capable resource entities. In an example, the tracing load may be a counter that is updated based on incoming traffic to the network entity, CPU utilization level, or a queue utilization level. It should be noted that the load information, e.g. CPU utilization level and/or queue utilization level may be obtained from each resource entity, whereby the tracing load may be determined specific to each resource entity. On the other hand the CPU utilization level and/or queue utilization level received from each resource entity may be aggregated to form a tracing load reflecting a load of all the resource entities. The determined tracing load may be utilized for instantiating one or more trace capable resource entities. For example, the tracing load may be used to determine a need for trace capable resource entities, whereby the needed trace capable resource entities may be instantiated.

In an example in accordance with at last some embodiments, phase 202 further comprises receiving, at the network entity, from an operations, administration and management, OAM, system one or more identity values and/or uniform resource indicators to one or more identity values; and phase 204 comprises determining, if the received message comprises information indicating a trace, based on the received one or more identity values and/or uniform resource indicators to one or more identity values. Examples of the identity values comprise international mobile subscriber identity (IMSI) and Mobile Station Integrated Services Digital Network (MSISDN). Using the uniform resource indicators, the identity values may be retrieved as needed and they do not have to be stored at the network entity.

In an example in accordance with at last some embodiments, phase 204 comprises that the information indicating a trace is a trace indication information element, IE, of: a Diameter Base Protocol, a header of a Hypertext Transfer Protocol (HTTP) message, a payload of a HTTP message or an ASN.1 message. In an example of the Diameter Base Protocol, the peer network entity may indicate that the current message is intended for tracing using a session-Id AVP of RFC-6733, Section 8.8, October 2012, ISSN: 2070-1721, where a trace indication may be set to the Optional value:

<Diameterldentity>;<high 32 bits>;<low 32 bits>[;<op-
       tional value>]

In another example of the Diameter Base Protocol, the peer network entity may indicate that the current message is intended for tracing using a session-Id AVP of RFC-6733, Section 8.8, October 2012, ISSN: 2070-1721, where a new AVP may be introduced. However, using the optional value may be preferred since the AVP is closest to the diameter header.

In an example of the header of the HTTP message, the HTTP message may be a HTTP2 message comprising a header called 3GPP-SBI-Trace-Indication for indicating a trace.

FIG. 3 illustrates an example of a method in accordance with at least some embodiments. The method provides improved support for traces in a communications system such that traced sessions may be processed separately from non-traced sessions, which allows that allocation and load distribution may be performed separately for the traced sessions and non-traced sessions.

The method may be performed by the network entity in connection with phase 204 for example. The method may start, when the network entity is configured to identify whether a received message comprises information indicating a trace and set of resource entities comprising trace capable resource entities, or T-Workers, and trace disabled resource entities, or N-Workers, is available to the network entity for processing messages received by the network entity.

Phase 302 comprises determining, at the network entity, whether the received message comprises information indicating a trace.

The method proceeds from phase 302 to phase 304, if it is determined in phase 302 that the received message does not comprise information indicating a trace.

Phase 304 comprises allocating, at the network entity, the received message or the subsequent messages of a session of the received message to the determined at least one trace disabled resource entity. In this way messages of sessions that are not traced may be processed by resources entities that are performance-optimized for the sessions that are not traced.

The method proceeds from phase 302 to phase 306, if it is determined in phase 302 that the received message comprises information indicating a trace.

Phase 306 comprises allocating, at the network entity, the received message or the subsequent messages of a session of the received message to the determined at least one trace capable resource entity, in accordance with phase 206 in FIG. 2. In this way messages of sessions that are traced may be processed by resources entities that are performance-optimized for the sessions that are traced.

Figure 4:
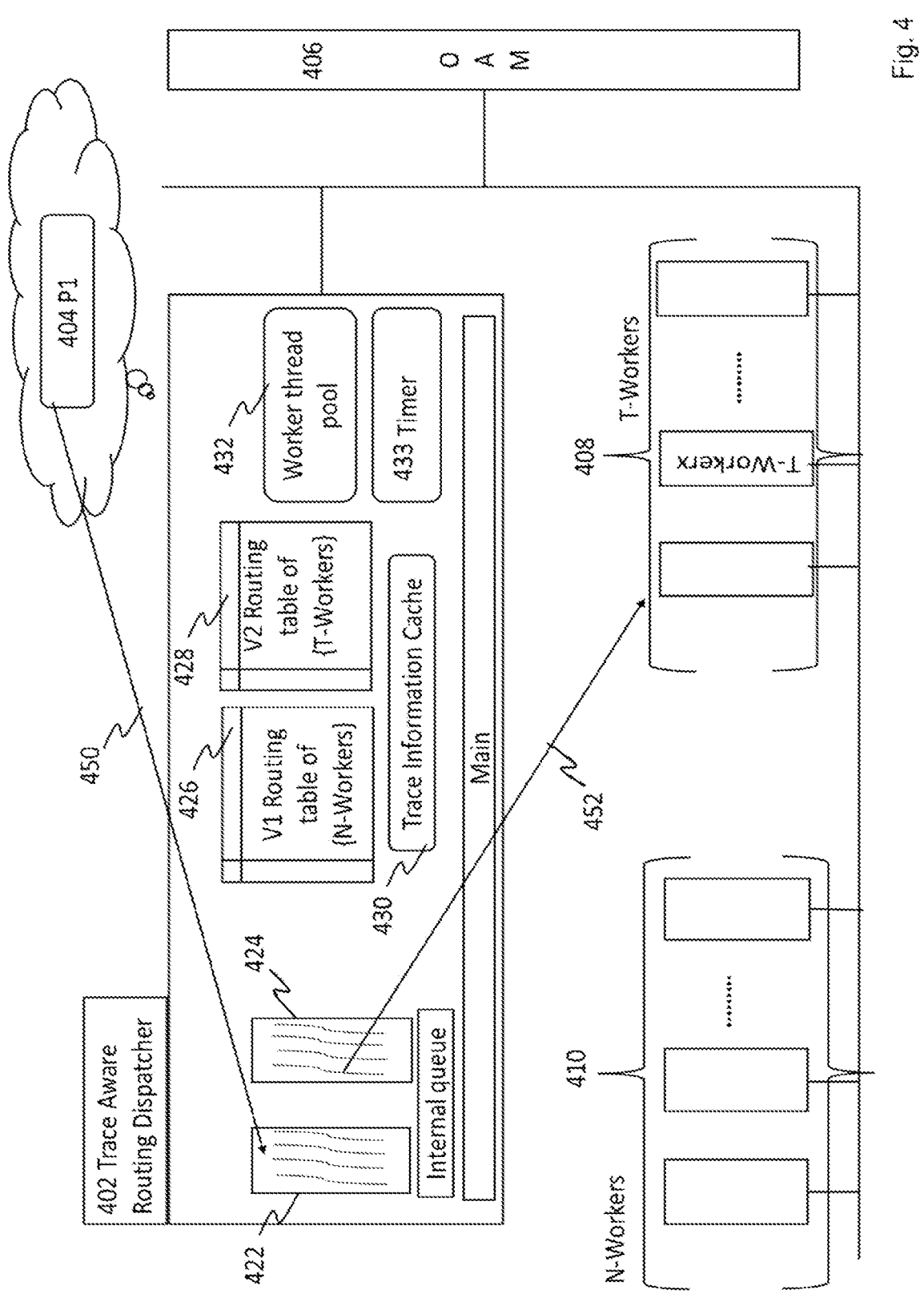
FIG. 4 illustrates an example of a system in accordance with at least some embodiments.

FIG. 4 illustrates an example of a system in accordance with at least some embodiments. The system comprises a network entity, a trace aware routing dispatcher, 402 that may be configured to execute a method in accordance with at least some embodiments. The trace aware routing dispatcher may be connected to one or more peer network entities, P1, 404, Operations, Administration and Management (OAM) system 406, and a set of resource entities comprising trace capable resource entities, or T-Workers, 408 and trace disabled resource entities, or N-Workers, 410. The trace aware routing dispatcher may comprise receiver threads 422, sender threads 424, a routing table of N-Workers 426 (V1 routing table), a routing table of T-Workers 428 (V2 routing table), a trace information cache 430, a worker thread pool 432 and a timer 433.

In an example, the peer network entities, P1, 404, may be a core network entity, a radio access network entity. Examples of the network entities comprise at least Call Session Control Function (CSCF), Diameter Routing Agent (DRA), Autonomous System (AS). The peer network entities may send messages associated with sessions to the trace aware routing dispatcher.

In an example, the Operations, Administration and Management (OAM) system 406, may provide configuring the trace aware routing dispatcher for identifying whether a received message comprises information indicating a trace and configuring a set of resource entities comprising trace capable resource entities, or T-Workers, and trace disabled resource entities, or N-Workers, to the network entity for processing messages received by the network entity. In an example, the trace aware routing dispatcher is configured by the OAM based on operator input. In an example, the OAM may configure at least part of the resource entities, e.g. T-Workers and N-Workers, at the trace aware routing dispatcher to have a configuration attribute indicating that the resource entity is a trace capable resource entity, whereby the trace enabled resource entities may be identified at the trace aware routing dispatcher easily from trace disabled resource entities. In an example, the information indicating a trace may comprise one or more identity values and/or uniform resource indicators to one or more identity values. Examples of the identity values comprise international mobile subscriber identity (IMSI) and Mobile Station Integrated Services Digital Network (MSISDN).

In an example, since the set of resource entities comprise trace capable resource entities, or T-Workers, 408 and trace disabled resource entities, or N-Workers, 410, the T-Workers may be optimized for traces and the N-Workers may be optimized for primary functions of the communications system.

In an example operation of the system of FIG. 4 in accordance with a method described in at least some embodiment, a receiver thread 422 at the trace aware routing dispatcher 402 receives a message 450 from the peer network entity 404. The received message may comprise a session identifier (session-id) that may be used at the trace aware routing dispatcher 402 to determine that a session of the message is marked for a trace. The receiver thread 422 may perform parsing to the received message to obtain the session-id or at least a part of the session-if, e.g. an optional part of the session-id and determined based on the information obtained by the parsing that the session of the message is marked for a trace. If the session is determined to be marked for a trace, the receiver thread may send 452 the received message to the sender thread 424 that is handling T-Workers 408. The sender thread performs a look up to the routing table of T-Workers 428, i.e. V2 routing table. The lookup provides information identifying a T-Worker, e.g. 'T-Workerx', for processing the received message. Accordingly, the received message is allocated to the T-Worker, in this example 'T-Workerx', identified based on the lookup. The sender thread sends the received message to the T-Worker allocated to the received message. The allocated T-Worker processes the received message and generates a response. The response is sent to the receiver thread 422 at the trace aware routing dispatcher. The response is sent from the receiver thread to the sender thread and from the sender thread to the P1. Meanwhile the T-Workerx asynchronously sends the traced message encoded to a Trace server. It should be noted that in this example of the operation of the system, the received message that identified the trace is also the traced message of a session. However, additionally, or alternatively, subsequent message to the first received message may be traced. In both case the tracing is supported by the trace aware routing dispatcher by routing the message(s) to be processed by the allocated trace enabled resource entity, T-Workerx.

In an example, in accordance with at least some embodiments, the trace aware routing dispatcher 402 may be configured to receive, or cache, from the OAM 406 one or more identity values and/or uniform resource indicators to one or more identity values. In an example, the one or more identity values may comprise IMSI and/or IMEI. In an example, the caching may be performed periodically based on the timer 433. In an example, the trace information cache may be updated based on the one or more identity values and/or uniform resource indicators to one or more identity values received from the OAM.

In an example, the V2 routing table 428 may be updated based on scaling of the trace enabled resource entities. Accordingly, if one or more instances of T-Workers are added, the added T-Workers may be added to the v2 routing table.

Figure 5:
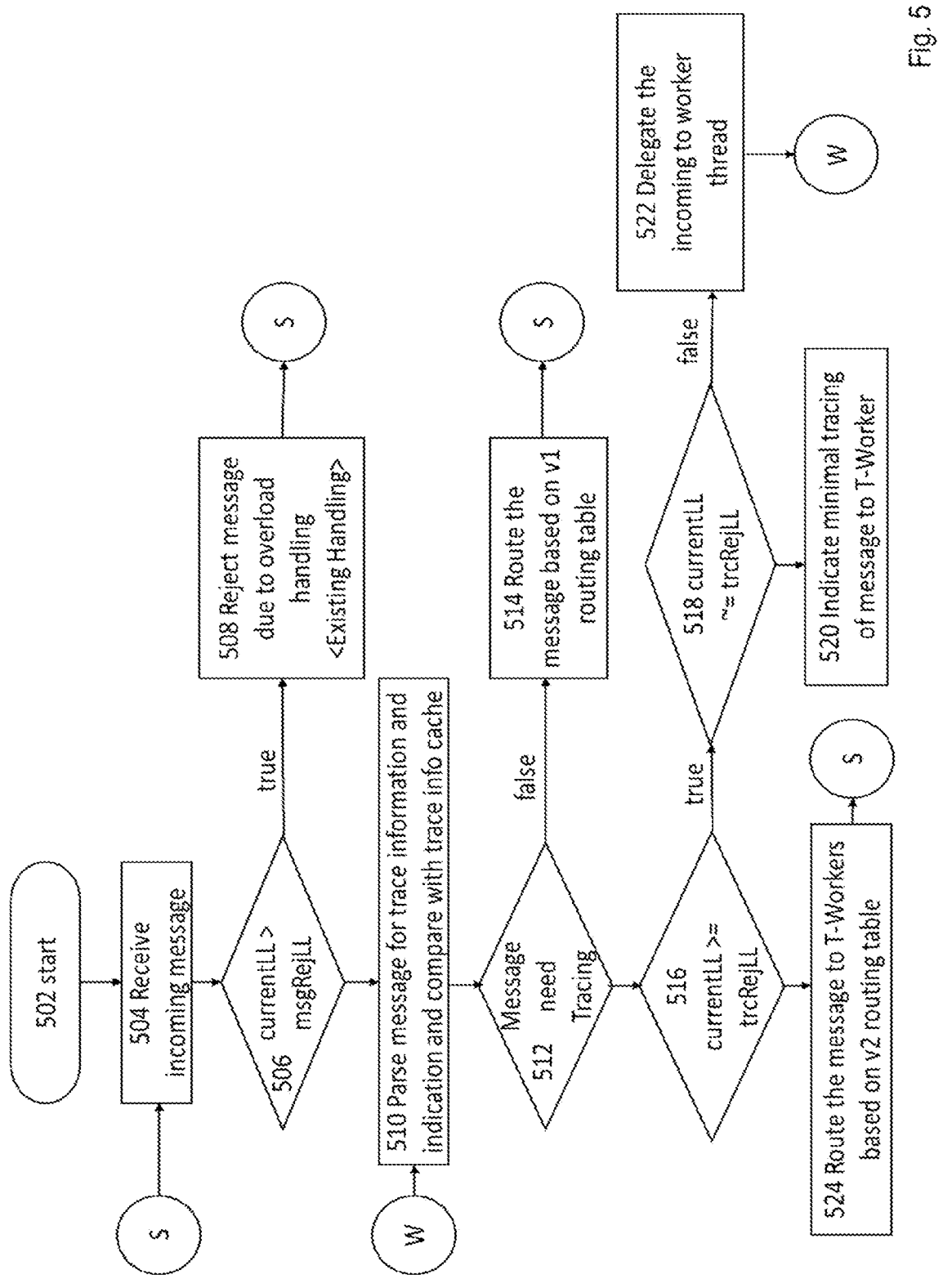

FIG. 5 illustrates an example of a method in accordance with at least some embodiments. The method enables a network entity to separate processing of traced sessions from non-traced sessions. The method may be performed by the trace aware routing dispatcher described with FIG. 4.

The method starts at phase 502, where the trace aware routing dispatcher is configured to identify whether the received message comprises information indicating a trace and the trace aware routing dispatcher is operatively connected to T-Workers and N-Workers, whereby processing of traced sessions from non-traced sessions may be separated.

Phase 504 comprises the trace aware routing dispatcher receiving a message from a peer network entity. In an example, the message may be a signaling message, for example a control plane message.

Phase 506 the trace aware routing dispatcher may determine if a current load level (currentLL) of the system meets a message rejection load level (msgRejLL). If the currentLL meets the msgRejLL, e.g. currentLL>msgRejLL, the method proceeds to phase 508. If the currentLL does not meet the msgRejLL, e.g. fails to meet currentLL>msgRejLL, the method proceeds to phase 510.

Phase 508 comprises rejecting the received message, whereby the received message is processed by one or more N-Workers instead of T-Workers. The method may proceed to 'S' and to phase 504.

Phase 510 comprises parsing the received message for information indicating a trace. In an example, the information indicating a trace may comprise trace information and a trace indication. The trace information and trace indication obtained by parsing may be compared with information stored at the trace information cache. Examples of the information indicating a trace are described with phase 204 above.

Phase 512 comprises determining if the received message needs to be traced. The determining may be performed based on a result of comparing the trace information and the trace indication obtained by parsing with information stored at the trace information cache. If it is determined that the received message needs to be traced, the method proceeds to phase 516. If it is determined that the received message does not need to be traced, the method proceeds to phase 514.

Phase 514 comprises routing the received message based on the routing table of N-Workers 426, thus V1 routing table. The method may proceed to 'S' and to phase 504.

Phase 516 comprises determining if the current load level is higher than equal to Tracing Load Level, thus currentLL≥trcRejLL. If the currentLL≥trcRejLL, the method proceeds to phase 524. Otherwise the method proceeds to phase 518.

Phase 518 comprises determining if the currentLL is at the trcRejLL, or the currentLL≅trcRejLL. If the currentLL is at the trcRejLL, the method proceeds to phase 520. Otherwise the method proceeds to phase 522.

Phase 522 comprises allocating, or delegating, the received message to a worker thread. The method may proceed to 'W' and to phase 510.

Phase 524 comprises routing the received message to T-Workers based on the routing table of N-Workers 428. The method may proceed to 'S' and to phase 504.

Phase 520 comprises indicating a minimal tracing criteria to a T-worker. In an example, the method may proceed to 'S' and to phase 504.

Next the method of FIG. 5 is described with reference to the system described with FIG. 4 in Examples 1 to 4:

EXAMPLE 1

In a first example, at the trace aware routing dispatcher 402, the message received at the receiver thread 422 may be parsed in phase 510 to presence of check session-id or AVP (RFC-6733), IMSI or MSISDN for determining in phase 512 if the received message comprises information indicating a trace, whereby the message or subsequent message of a session need tracing. In an example of phase 512, if the session-id or AVP are present the trace aware routing dispatcher may determine to allocate the message to T-workers and the method may proceed to phase 516. In another example of phase 512, if the session-id or AVP are not present, the trace aware routing dispatcher may look up the received message for an identity value, e.g. IMSI or MSISDN, and compare the identity value against a trace information cache 430 at the trace aware routing dispatcher. The trace information cache may be built during start up from configuration, e.g. from OAM or look up of a URI that resolves to a Tracing configuration object. Such URI can be registered for example in Network Repository Function (NRF) for benefitting other NFs in the network. It should be noted that NRF is optional. If the IMSI or MSISDN are found in the trace information cache the trace aware routing dispatcher may determine to allocate the message to T-workers and the method may proceed to phase 516. In phases 516 and 518, allocation of the received message to T-Workers may be controlled based on load information and the method may proceed to phases 524 and 520. In phases 524 and 520 the trace aware routing dispatcher may perform a look up to the V2 routing table 428 and send the message to a T-Worker based on the look up. Based on the conditions in phases 516 and 518, the phases 524 and 520 may be executed provided a current load level of the system is within the threshold of Tracing Load Level, trcRejLL. It should be noted that if the T-Workers are not available in phases 520 and 522 or minimum constituency is not reached, the message is routed by the trace aware routing dispatcher to an N-Worker based on V1 routing table 426.

EXAMPLE 2

In an example of phase 522, the receiver thread 422 may delegate parsing and/or inspection of the received message at the trace aware routing dispatcher, to a worker thread at the worker thread pool 432. Based on the conditions in phases 516 and 518, the phase 522 may be performed, if current load level of the system is at the threshold of Tracing Load Level, trcRejLL. The worker thread may perform the phase 510 and phase 512 in accordance with described in the above Example 1. If the method proceeds to phase 516, the method may proceed to phases 524 and 520, where the trace aware routing dispatcher may perform a look up to the V2 routing table 428 and send the message to a T-Worker based on the look up.

EXAMPLE 3

In an example, the phase 520 may be performed based on the conditions in phases 516 and 518, if the current load level of the system is more than the Tracing Load Level, trcRejLL. The parsing and message inspection may be performed in phase 510 and 512 as described with the Example 1 above.

EXAMPLE 4

The check currentLL>msgRejLL in phase 506 provides that a full overload of the system may be detected. Accordingly, if currentLL>msgRejLL is true, the system is in full overload and the message is rejected in phase 508.

Figure 6:
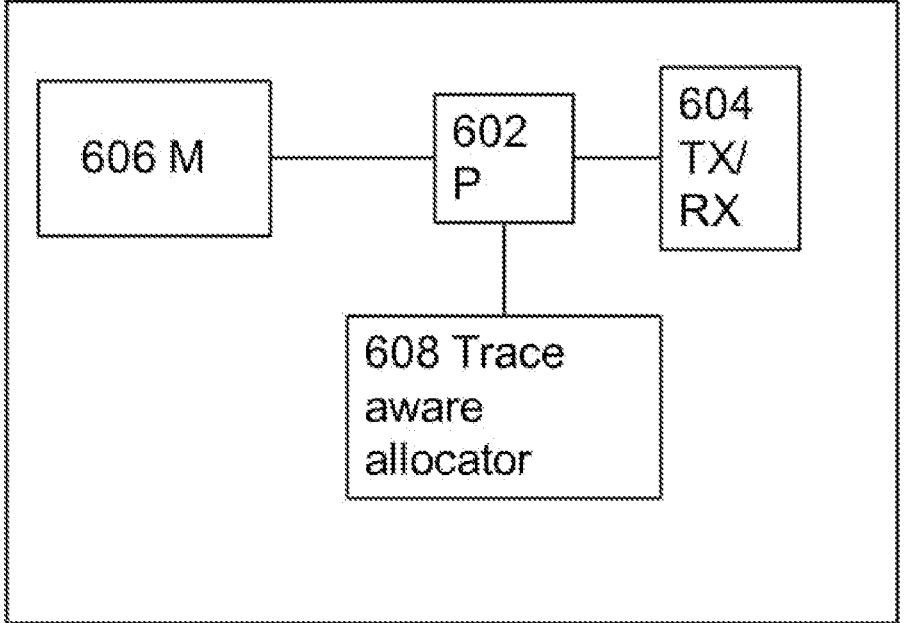
FIG. 6 illustrates a block diagram of an apparatus in accordance with at least some embodiments.

FIG. 6 illustrates an example of an apparatus in accordance with at least some embodiments of the present invention. The apparatus may be a network entity. The apparatus may be configured to support one or more control plane procedures in communications system.

The apparatus comprises a processor 602 and a transceiver 604. The processor is operatively connected to the transceiver for controlling the transceiver. The apparatus may comprise a memory 606. The memory may be operatively connected to the processor. It should be appreciated that the memory may be a separate memory or included to the processor and/or the transceiver.

In an example, the apparatus of FIG. 6 comprises a trace aware allocator 608 connected operatively to the processor. The trace aware allocator may be configured to perform one or more functionalities described in an example described herein, comprising receiving one or more messages from a network entity, determine, if the received message comprises information indicating a trace, at least one trace capable resource entity for processing the received message or subsequent messages of a session of the received message from a set of resource entities comprising trace capable resource entities and trace disabled resource entities, and allocate the received message or the subsequent messages of a session of the received message to the determined at least one trace capable resource entity. Examples of the trace aware allocator comprise a load balancer and a trace aware routing dispatcher.

According to an embodiment, the processor 602 is configured to control the transceiver and/or to perform one or more functionalities described with a method according to an embodiment.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, program instructions, instructions, computer code etc. should be understood to express software for a programmable processor firmware such as the programmable content of a hardware device as instructions for a processor or configured or configuration settings for a fixed function device, gate array, programmable logic device, etc.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
receiving, at a network entity, a message from at least one peer network entity;
determining, at the network entity, if the received message comprises information indicating a trace, at least one trace capable resource entity for processing the received message or subsequent messages of a session of the received message from a set of resource entities comprising trace capable resource entities and trace disabled resource entities;
allocating, at the network entity, the received message or the subsequent messages of a session of the received message to the determined at least one trace capable resource entity.

2. The method according to claim 1, comprising:
determining, at the network entity, if the received message does not comprise information indicating a trace, at least one trace disabled resource entity for processing the received message or subsequent messages of a session of the received message from a set of resource entities comprising trace capable resource entities and trace disabled resource entities;
allocating, at the network entity, the received message or the subsequent messages of a session of the received message to the determined at least one trace disabled resource entity.

3. The method according to claim 1, comprising:
determining, at the network entity, at least one tracing load;
scaling, at the network entity, if the tracing load level exceeds a load threshold, the set of resource entities based on the tracing load.

4. The method according to claim 1, wherein the trace capable resource entities are dedicated for traces and the trace disabled resource entities are dedicated for session processing.

5. The method according to claim 1, comprising:
receiving, at the network entity, from an operations, administration and management, OAM, system one or more identity values and/or uniform resource indicators to one or more identity values; and
determining, at the network entity, if the received message comprises information indicating a trace, based on the received one or more identity values and/or uniform resource indicators to one or more identity values.

6. The method according to claim 1, wherein the information indicating a trace is a trace indication information element, IE, of: a Diameter Base Protocol, a header of a HTTP message, a payload of a HTTP message or an ASN.1 message.

7. A network entity comprising one or more processors, and memory storing instructions that, when executed by the one or more processors, the network entity is caused to:
receive, at the network entity, a message from at least one peer network entity;
determine, at the network entity, if the received message comprises information indicating a trace, at least one trace capable resource entity for processing the received message or subsequent messages of a session of the received message from a set of resource entities comprising trace capable resource entities and trace disabled resource entities;
allocate, at the network entity, the received message or the subsequent messages of a session of the received message to the determined at least one trace capable resource entity.

8. The network entity according to claim 7, comprising:
determine, at the network entity, if the received message does not comprise information indicating a trace, at least one trace disabled resource entity for processing the received message or subsequent messages of a session of the received message from a set of resource entities comprising trace capable resource entities and trace disabled resource entities;
allocate, at the network entity, the received message or the subsequent messages of a session of the received message to the determined at least one trace disabled resource entity.

9. The network entity according to claim 7, comprising:
determine, at the network entity, at least one tracing load;
scale, at the network entity, if the tracing load level exceeds a load threshold, the set of resource entities based on the tracing load.

10. The network entity according to claim 7, comprising:
wherein the trace capable resource entities are dedicated for traces and the trace disabled resource entities are dedicated for session processing.

11. The network entity according to claim 7, comprising:
receiving at the network entity, from an operations, administration and management, OAM, system one or more identity values and/or uniform resource indicators to one or more identity values; and
determining, at the network entity, if the received message comprises information indicating a trace, based on the received one or more identity values and/or uniform resource indicators to one or more identity values.

12. The network entity according to claim 7, wherein the information indicating a trace is a trace indication information element, IE, of: a Diameter Base Protocol, a header of a HTTP message, a payload of a HTTP message or an ASN.1 message.

13. A non-transitory computer readable medium comprising program instructions for causing a network entity to perform at least the following:

receive, at the network entity, a message from at least one peer network entity;

determine, at the network entity, if the received message comprises information indicating a trace, at least one trace capable resource entity for processing the received message or subsequent messages of a session of the received message from a set of resource entities comprising trace capable resource entities and trace disabled resource entities;

allocate, at the network entity, the received message or the subsequent messages of a session of the received message to the determined at least one trace capable resource entity.

\* \* \* \* \*